United States Patent
Stoliar et al.

[11] Patent Number: 5,946,844
[45] Date of Patent: *Sep. 7, 1999

[54] RETRIEVAL HOOK

[76] Inventors: Arthur P. Stoliar; Joan Stoliar, both of 46 Jane St., New York, N.Y. 10014

[ * ] Notice: This patent issued on a continued prosecution application filed under 37 CFR 1.53(d), and is subject to the twenty year patent term provisions of 35 U.S.C. 154(a)(2).

[21] Appl. No.: 08/692,848

[22] Filed: Jul. 24, 1996

[51] Int. Cl.⁶ .................................................. A01K 97/24
[52] U.S. Cl. ...................... 43/17.2; 294/19.1; 114/221 R
[58] Field of Search .................. 43/17.2, 43.16; 294/19.1; 114/221 R, 230; 248/205.2

[56] References Cited

U.S. PATENT DOCUMENTS

| | | | |
|---|---|---|---|
| 407,426 | 7/1889 | Wisdon | 294/19.1 |
| 3,023,536 | 3/1962 | Williams | 43/43.16 |
| 3,733,097 | 5/1973 | Hank, Jr. | 294/19.1 |
| 4,667,617 | 5/1987 | Molitor | 114/221 R |
| 4,836,061 | 6/1989 | Weinraub | 81/15.9 |
| 5,082,120 | 1/1992 | Vega | 211/20 |
| 5,097,622 | 3/1992 | James | 43/43.16 |
| 5,411,238 | 5/1995 | Caron | 248/664 |
| 5,520,134 | 5/1996 | Walker | 114/230 |
| 5,564,610 | 10/1996 | Barron | 224/268 |
| 5,566,538 | 10/1996 | Frazier et al. | 56/239 |
| 5,617,668 | 4/1997 | Shimandle | 43/44.8 |
| 5,622,399 | 4/1997 | Albright | 294/24 |
| 5,628,538 | 5/1997 | Ericksen | 294/19.1 |
| 5,724,762 | 3/1998 | Thompson | 43/17.2 |
| 5,738,080 | 4/1998 | Brocco, Jr. | 248/205.2 |
| 5,740,751 | 4/1998 | Peever et al. | 114/221 R |

OTHER PUBLICATIONS

Orvis Fishing And Outdoor 1997, p. 63, Gadgets And Gear, "Fly 'Retreev'", Jan. 1997.

*Primary Examiner*—Michael J. Carone
*Assistant Examiner*—Darren Ark
*Attorney, Agent, or Firm*—Seymour Levine

[57] ABSTRACT

A compact, light weight device for facilitating the retrieval of artificial flies from trees or other elevated objects includes a hook which may be coated with a soft non-slip material coupled to a quick release strap, which may be made of "hook and loop" material, and a strong line. The strap is wrapped around a pole to position the hook. The pole may be removed from the release strap before the line is pulled to facilitate the object retrieval. A tube with one open and one closed end may be coupled to hook. A pole or the tip of a fly rod may be inserted into the tube to position the hook. This pole or fly rod may be removed after the hook is positioned.

8 Claims, 5 Drawing Sheets

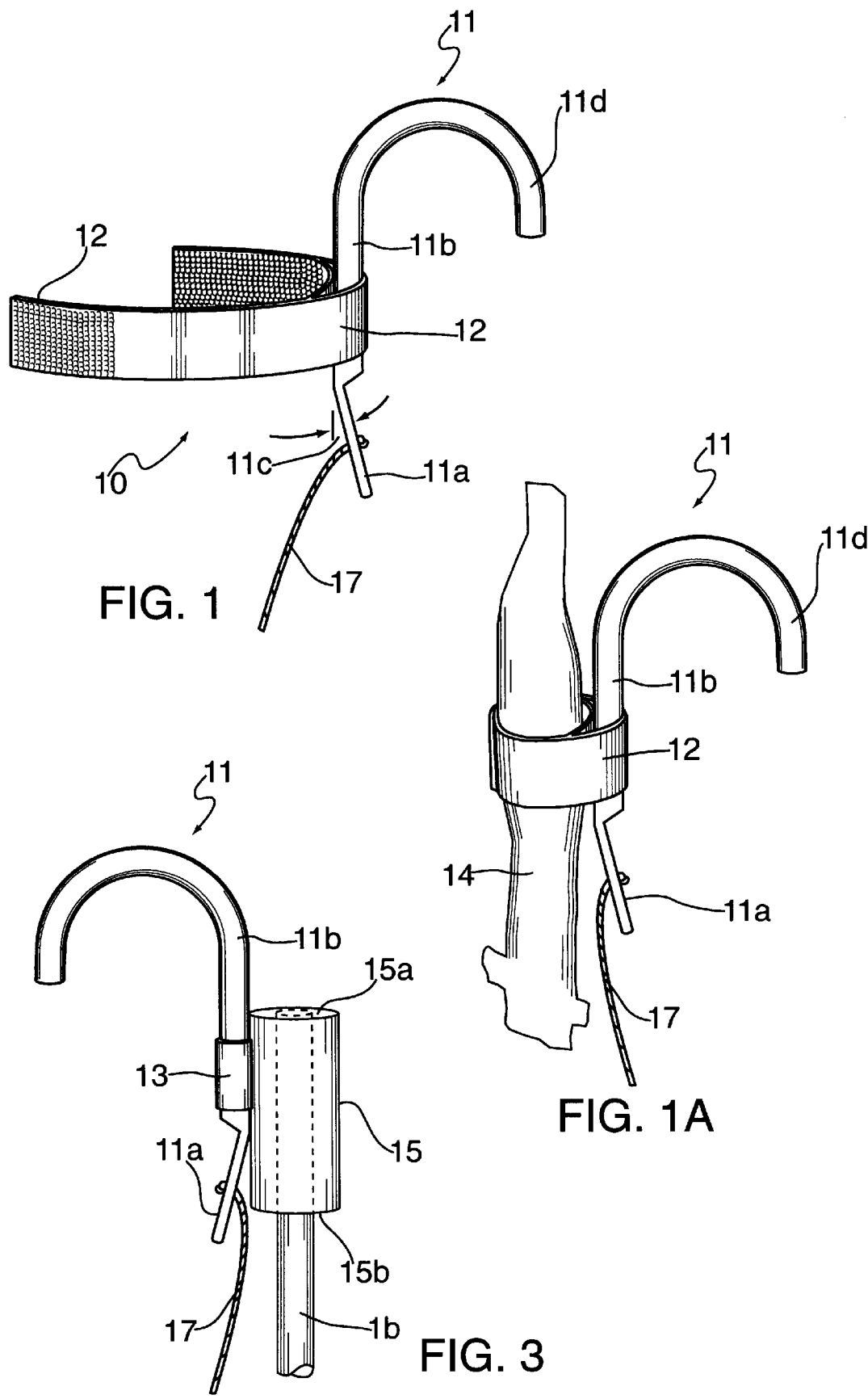

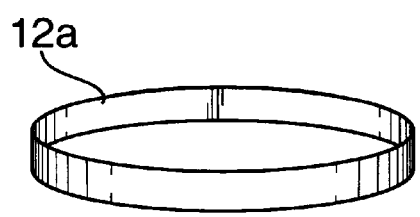 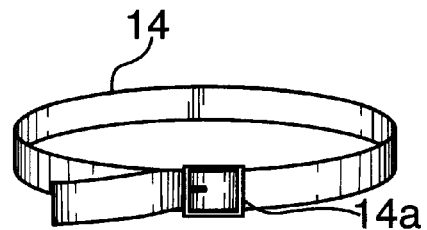
FIG. 1B  FIG. 1C
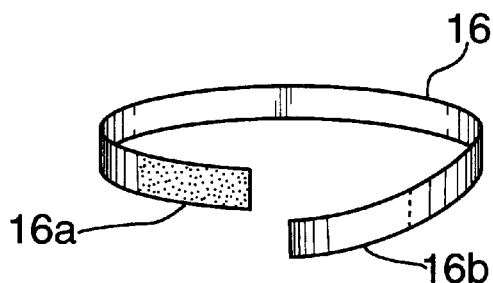 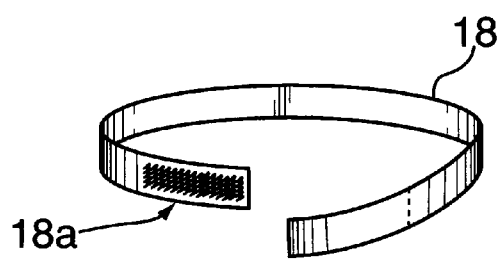
FIG. 1D  FIG. 1E
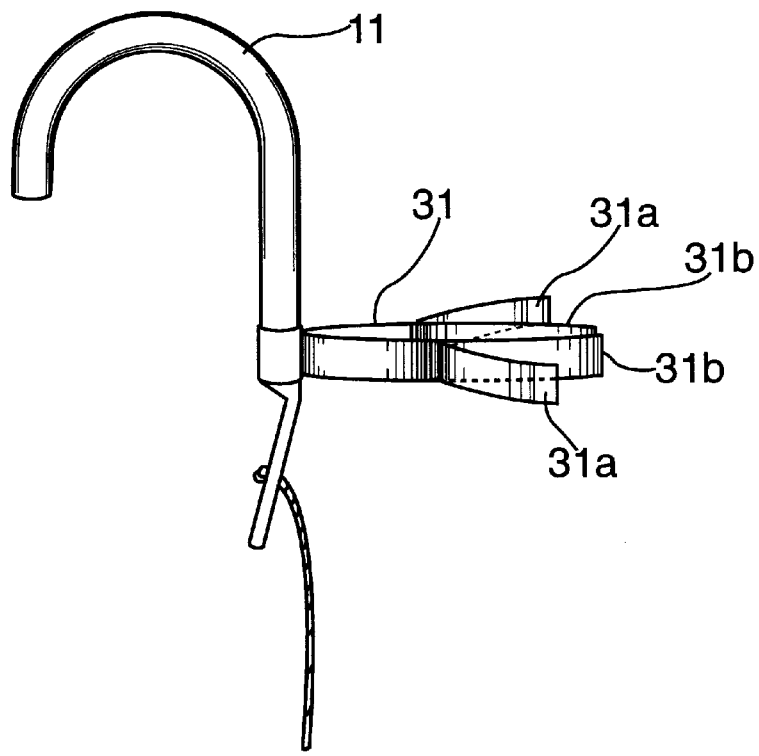
FIG. 5

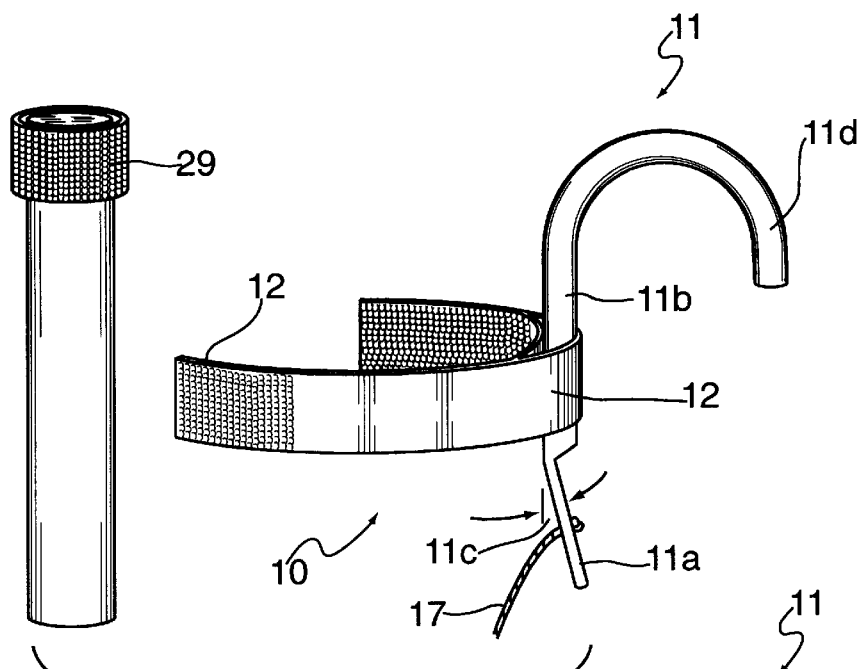
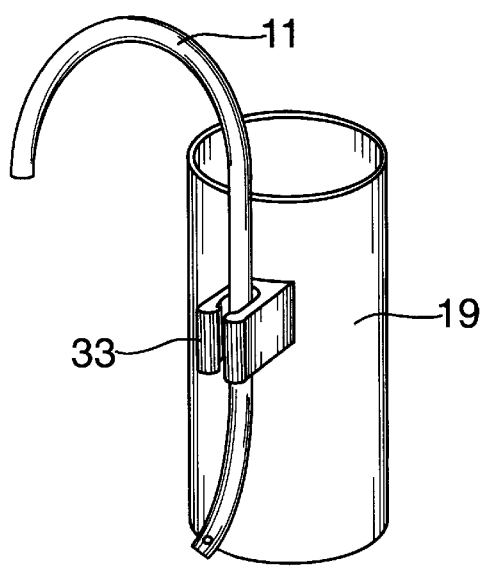
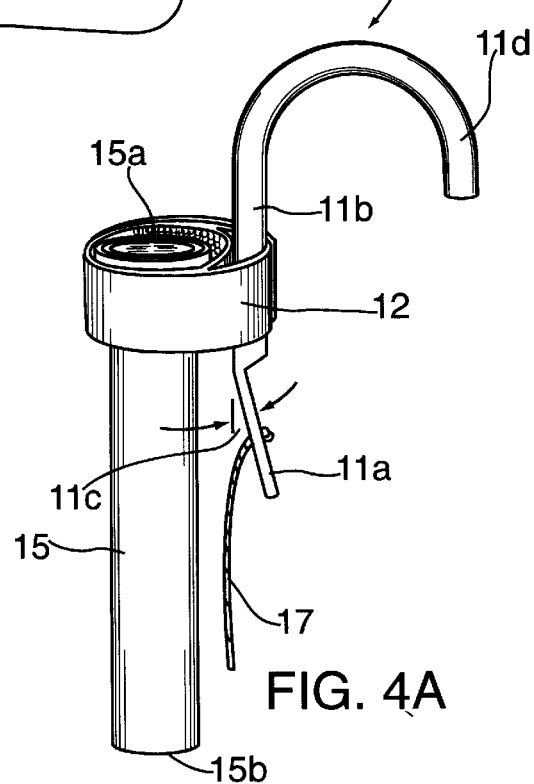
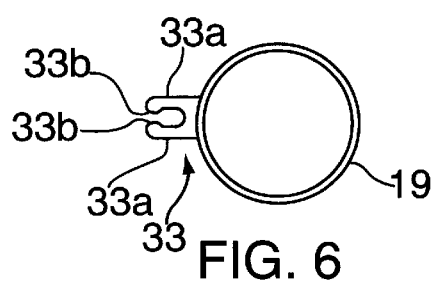
FIG. 4
FIG. 7
FIG. 4A
FIG. 6

RETRIEVAL HOOK

BACKGROUND OF THE INVENTION

Sport fishing is rooted in antiquity. Even when his existence depended upon his success in catching fish, man found pleasure in that pursuit and used fishing as a recreational activity. Fish do not always swim near the banks of a river. Cognizant of this, early man saw the advantage of using a rod (stick or branch) which allowed him to reach over river banks and angle the bait to where the fish were located, thus the name "angling" given to sport fishing.

One of the basic methods of angling is fly-fishing. In this method of fishing an artificial fly, i.e., an imitation of an insect or other natural food, is used to lure the fish. Such a method has been employed by sportsmen for thousands of years. In Roman times it was recorded that Macedonians caught trout with artificial flies.

When fly-fishing, an artificial fly is cast to the fish by means of a flexible rod and a thick line. The thick line, which is known as a fly-line, is tapered to a fine line to which a "leader" is attached. The leader is often made of NYLON monofilament which may be tapered to a fine point, "tippet", to which the fly is attached. The tippet is, hopefully, invisible to the fish, creating the impression that the artificial fly is a free floating insect. The force to initiate the cast is provided by an appropriate motion of the fisherman's arm and wrist. This force is transmitted to the rod, and a combination of the spring-like action of the rod, the weight of the line, and the taper of the line and leader allows a smooth transmission of the force to achieve distance and delicacy in presenting the fly to the fish.

In the process of casting, the fly-line is often extended as far to the rear of the individual doing the casting as it is to front of him. Sometimes the fly inadvertently gets hooked or entangled in an object to the rear, such as a branch or leaf of a tree, from which disengagement is often difficult. A good casting technique propels the fly high off the ground. Consequently, when a fly is caught in a tree it is usually at a height that is difficult to reach. Pulling on the fly-line to draw down the branch so that it can be taken in hand is not often productive. Since the leader tapers to very thin line, it is concomitantly weak and will generally break under the tension created therein by the pulling force. The fly-fisher usually is not fortunate enough to find a long stick that has a conveniently located hooked shaped branch which could be used for hooking over the offending branch to draw it down.

In the prior art artificial flies have been retrieved with special long sticks or telescoping rods with hooked ends, devices which cut the branch. These are often eschewed by fly-fishers because they are burdensome to carry and may damage the tree. The fishing rods and wading staffs often carried by fly-fishers are, by themselves, unsuitable implements for retrieving a tree entangled artificial fly. Further, the fishing rod, which is generally an expensive item, may be damaged in the retrieval process if it is used carelessly.

It is an object of this invention to provide a device which is (1) versatile in allowing a fly-fisher several practical options to effectively and safely retrieve a hooked or entangled fly and (2) very compact, lightweight, and easy to carry.

SUMMARY OF THE INVENTION

A retrieval hook in accordance with the invention includes a hook coupled to "hook and loop" material which can be wrapped around a pole or similar object in a removable manner. The pole positions the hook at an object to be retrieved and is thereafter removed. A line coupled to the hook is pulled to retrieve the object. Should the object to be retrieved be entangled on the branch of a tree, the hook is positioned to grasp the branch, the pole is removed, and line is pulled to bring the branch within reach for the removal of the object.

In another embodiment of the invention, the hook is coupled to a tube having an open end and a closed end. A pole, most suitably a fishing rod, is inserted into the tube through the open end and the hook is appropriately positioned by the pole which is then removed from the tube and the object is retrieved by pulling on the line coupled to the hook. The hook may be coupled to the tube by wrapping the "hook and loop" material, which is coupled to the hook, around a band on the tube which is made of material which mates the "hook and loop" material. Other methods of coupling the hook to the tube include a clamp which wraps around the tube, the hook being attached to the hook, and a detent on the tube into which hook may be inserted and held.

BRIEF DESCRIPTION OF THE DRAWINGS

FIG. 1 is an illustration of a preferred embodiment of the invention.

FIG. 1A illustrates the coupling of the embodiment of FIG. 1 to a staff.

FIG. 1B is an illustration of an adjustable band which may be employed for the strap of FIG. 1.

FIG. 1C is an illustration of strap with an adjustable buckle which may be employed for the strap of FIG. 1.

FIG. 1D is an illustration of a material with a tacky wax which may be employed for the strap of FIG. 1.

FIG. 1E is an illustration of a material with sharp points which may be employed for the strap of FIG. 1.

FIG. 3 is an illustration of a second preferred embodiment of the invention coupled to a staff.

FIG. 4 shows elements of the second preferred embodiment of the invention and illustrates the assembly thereof.

FIG. 4A shows the assembly of the elements of FIG. 4.

FIG. 5 is a drawing of a hook coupled to a clamp adapted for coupling to a tube with one closed end.

FIG. 6 is a plan view of a closed end tube with a hook retainer coupled thereto.

FIG. 7 shows an assembly of a hook coupled to a tube having a hook retainer.

DESCRIPTION OF THE PREFERRED EMBODIMENTS

Figure 2A:
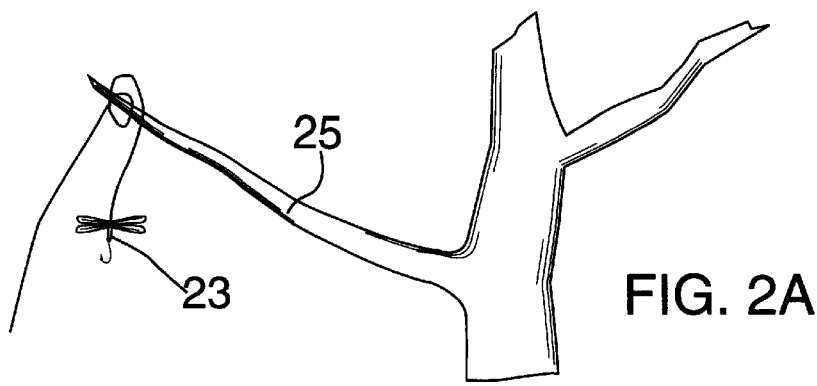
FIGS. 2A–2E illustrate the retrieval of an elevated object with the use of embodiments of the invention.
Figure 2B:
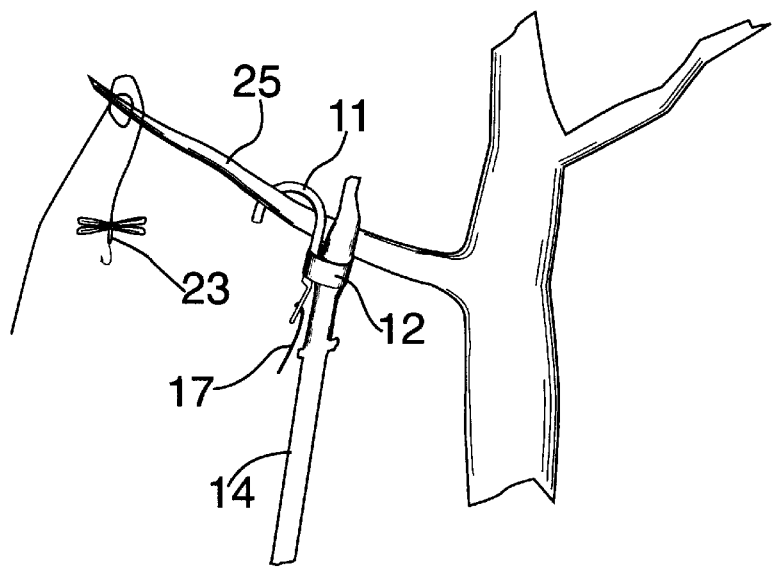
Figure 2C:
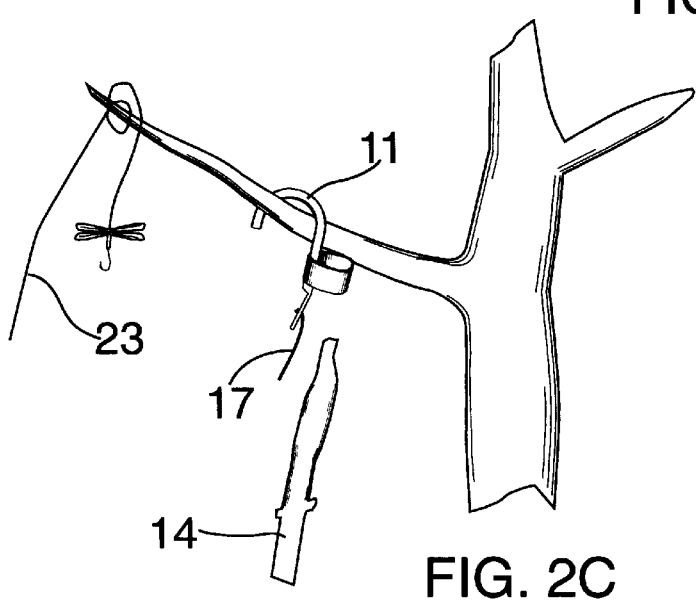
Figure 2D:
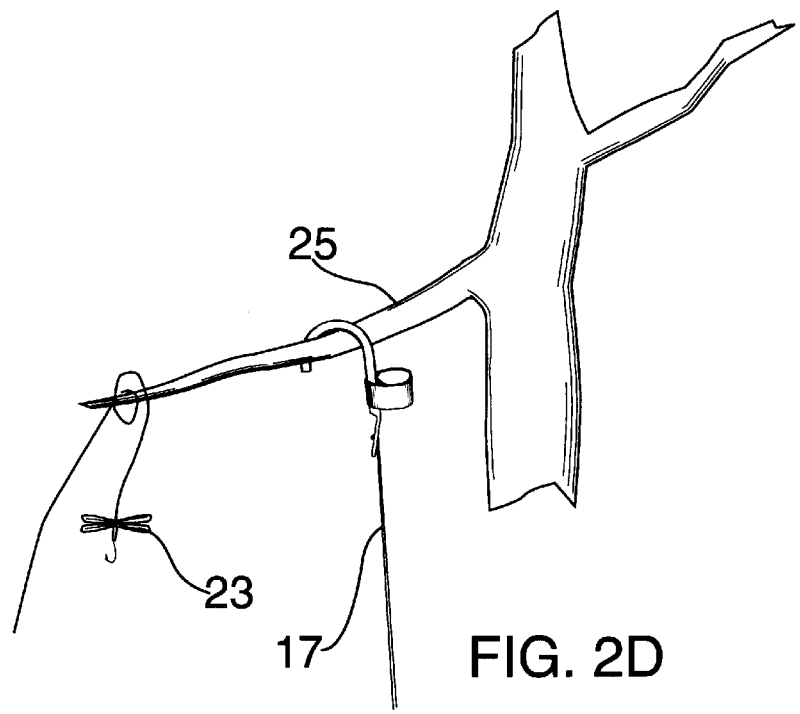

In the descriptions to follow like elements referenced in the figures bear the same reference numerals.

Refer now to FIG. 1. A compact, lightweight retrieval hook 10 may comprise a hook 11, which may be coated with a soft non-slip material, coupled to a quick release strap 12, portions of which may have a "hook and loop" material situated thereon, such as that sold under the trademark VELCRO. The hook comprises an arcuate section 11d, which may extend for 180°, a shank 11b, which is linear may extend tangentially from the arcuate section 11d, and an offset section, 11a, which is offset from the shank section 11b towards the opening of the arcuate section 11d by an acute angle 11c. The offset section 11a additionally includes means for coupling to a line or other type of pulling mechanism. As shown in FIG. 1A, the strap may be of a length sufficient to wrap around a staff, tree branch, or other supporting device having a diameter between ½ inch and 2 inches. This length, however, is not critical, a longer length may be used if desired. The offset 11c is such as to permit the hook shank 11b to be parallel to the staff, tree branch, or other supporting device 14 when hook end 11a is permanently or removably coupled to a line 17.

Those skilled in the art will recognize that the strap 12 need not be limited to "hook and loop" material. Such items as an elastic band, an adjustable buckle strap, or a material coated with a tacky wax or a series of sharp points may be employed for coupling the hook to a staff in a quick release fashion. These items are illustrated in FIGS. 1B through 1E. An elastic band 12a is shown in FIG. 1B; a strap 14 and adjustable buckle 14a are shown in FIG. 1C; a material 16 having a section 16a coated on one side with a tacky wax and a section 16b coated on a side opposite the one side with a tacky wax for mating to the tacky wax of section 16a is shown in FIG. 1D; and a material 18 having a section 18a with a series of sharp points is shown in FIG. 1E.

Referring now to FIGS. 2A–2D, an object 23, such as an artificial fly, entangled in a tree branch 25 or other elevated location may be retrieved by wrapping the strap 12 around a staff 14 and, with the aid of the staff 14, positioning the hook 11 on the tree branch 25. The staff may then be removed and the object retrieved by pulling on a line 17 attached to the hook 11. Removal of the staff 14 from the strap 12 is facilitated by the offset 11c which maintains the hook shank parallel to the staff 14 and the line 17 at a distance from the staff 14. When the line 17 is pulled the branch 25 is pulled down to a reachable level thereby permitting the easy removal of the object.

Refer now to FIG. 3. The hook 11 may be coupled permanently or removably via a coupling element 13 to a tube 15 having a closed end 15a and an open end 15b. The hook 11 may be permanently or removably coupled to a line 17. As illustrated in FIGS. 2A–2D, an object, such as an artificial fly 23, entangled in a tree branch 25 or other elevated location may be retrieved by positioning the hook 11 on the tree branch 25 with the aid of a staff 16 removably inserted into the tube 15 through the open end 15b, removing the staff 16 from the tube after the hook 11 has been properly positioned, and pulling on the line 17 to remove the object 23 from a branch 25.

An illustration of a hook 11 removably coupled to the tube 15 is shown in FIG. 4. The tube 15 has "hook and loop" material 29 matching that of strap 12 attached. Preferably the "hook and loop" material 29 forms a circumferentially band around the tube 15. The hook 11 is securely coupled to the tube 15 by wrapping the strap 12 around the band 29, as shown in FIG. 4A. Though tube 15 is shown as a circular cylinder, it should be apparent that this is not a limitation and that other cross-sectional shapes may be employed.

Figure 2E:
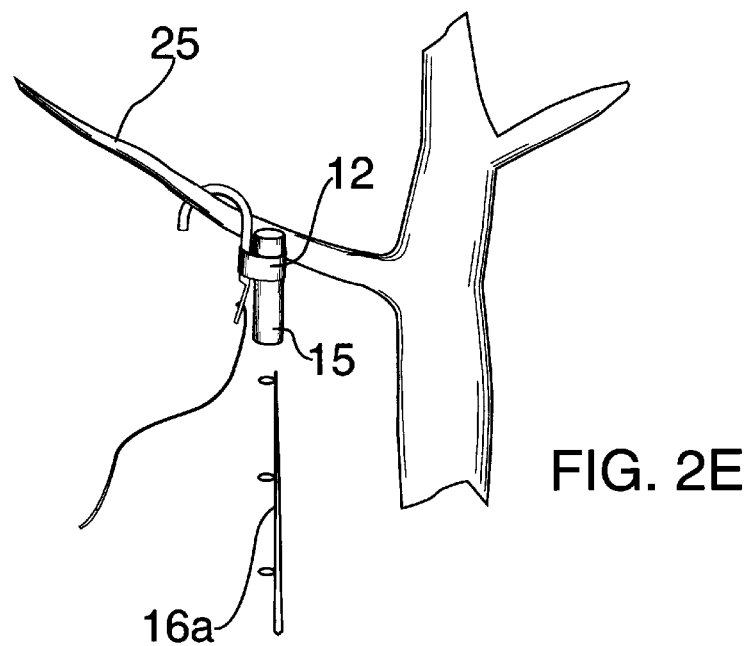

When other suitable staffs are not available, the staff inserted in the tube 15 may be a fishing rod 16a, as shown in FIG. 2E. The offset 11c maintains the hook shank 11b parallel to the tube 15 and the fishing rod 16a. This parallel relationship reduces the possibility of the line 17 from being entangled with the fishing rod 16a and facilitates the removal of the fishing rod 16a from the tube 15.

Since fishing rods are delicate items, the weight of the tube and strap assembly is an important consideration. The tube should be of a light weight material and have a length no longer than that required for the tube to remain on the fishing rod while the hook is being positioned. The strap 12 need be no longer than necessary to provide a positive coupling to the tube.

The hook 11 may also be removably coupled to the tube 15 with a clamp 31 attached to the hook 11, as shown in FIG. 5, wherein, for clarity, the tube 15 is not shown. In this configuration the retrieval hook 10 comprises the hook 11 and clamp 31. Arms of the clamp 31, when in the open position 31a provide sufficient clearance to permit the insertion of the tube 15 therebetween and to securely hold the tube 15 when in the closed position 31b. After the tube 15 has been inserted between the arms of the clamp, the arms are closed to position 31b to securely hold the tube 15, thereby securely coupling the hook 11 to the tube 15.

A plan view of a tube 19 having an integral hook retainer 33 for holding the hook 11 is shown in FIG. 6. The hook retainer 33 and tube 19 may be molded as one piece or the retainer 33 and tube 19 may be separate elements which are assembled by gluing or other appropriate methods. A retainer clamp 33 may comprise spring like arms 33a that are terminated with detents 33b. The hook 11 is pushed past the detents 33b which, due to spring action of the arms 33a, separate to provide sufficient clearance for the insertion of the hook 11. Once past the detents 33b, the hook 11 is securely held to the tube 19 by the spring force of the arms 33a and the detents 33b which prevent movement of the hook 11. An illustration of the hook 11 coupled to the tube 19 by the retainer clamp 33 is shown in FIG. 7.

While the invention has been described in its preferred embodiments, it is understood that the words which have been used are words of description rather than limitation and that changes may be made within the purview of the appended claims without departing from the true scope and spirit of the invention in its broader aspects.

We claim:

1. An apparatus comprising:
    a hook having an arcuate section coated with soft non-slip material, a linear shank section tangentially extending from said arcuate section, and a linear offset section extending from said linear shank section at a preselected acute angle towards said arcuate section, said offset section having means for coupling to a pulling force, coupling means positioned on said linear shank section for coupling said hook to an external element, said coupling means constructed and arranged to permit decoupling said external element without accessing said coupling means, and said arcuate section having a blunt terminal end.

2. An apparatus in accordance with claim 1 wherein said coupling means is a strap with hook and loop material situated thereon.

3. An apparatus in accordance with claim 1 further including a line coupled to said means for coupling to a pulling force.

4. An apparatus in accordance with claim 2 further including a line coupled to said means for coupling to a pulling force.

5. An apparatus in accordance with claim 1 wherein said coupling means is an elastic band.

6. An apparatus in accordance with claim 1 wherein said coupling means is an adjustable buckle strap.

7. An apparatus in accordance with claim 1 wherein said coupling means is a flexible material coated with tacky wax.

8. An apparatus in accordance with claim 1 wherein said coupling means is a flexible material coated with sharp points.

* * * * *